United States Patent

Besser (10) Patent No.: US 9,680,728 B2
(45) Date of Patent: Jun. 13, 2017

(54) ARRANGEMENTS FOR MONITORING NETWORK TRAFFIC ON A CLOUD-COMPUTING ENVIRONMENT AND METHODS THEREOF

(71) Applicant: Ixia, Calabasas, CA (US)

(72) Inventor: Sharon Shalom Besser, Calabasas, CA (US)

(73) Assignee: Ixia, Calabasas, CA (US)

(*) Notice: Subject to any disclaimer, the term of this patent is extended or adjusted under 35 U.S.C. 154(b) by 196 days.

(21) Appl. No.: 13/765,628

(22) Filed: Feb. 12, 2013

(65) Prior Publication Data

US 2014/0229605 A1    Aug. 14, 2014

(51) Int. Cl.
  *G06F 11/00*   (2006.01)
  *G06F 15/173*  (2006.01)
  *H04L 12/26*   (2006.01)
  *H04L 29/06*   (2006.01)
  *H04L 12/46*   (2006.01)

(52) U.S. Cl.
  CPC .......... *H04L 43/12* (2013.01); *H04L 12/4633* (2013.01); *H04L 63/1416* (2013.01); *H04L 63/1425* (2013.01); *H04L 63/306* (2013.01)

(58) Field of Classification Search
  CPC .. H04L 43/12; H04L 63/1425; H04L 12/4633
  USPC ............... 709/217–219, 223–224, 249–250; 718/105; 726/22, 23
  See application file for complete search history.

(56) References Cited

U.S. PATENT DOCUMENTS

| | | | |
|---|---|---|---|
| 7,899,048 B1* | 3/2011 | Walker et al. | 370/390 |
| 2006/0072543 A1* | 4/2006 | Lloyd | H04L 12/2602 370/351 |
| 2007/0195776 A1* | 8/2007 | Zheng et al. | 370/392 |
| 2007/0280243 A1* | 12/2007 | Wray et al. | 370/392 |
| 2008/0044018 A1* | 2/2008 | Scrimsher et al. | 380/210 |
| 2010/0138920 A1* | 6/2010 | Kim | H04L 63/1416 726/22 |
| 2010/0199275 A1* | 8/2010 | Mudigonda et al. | 718/1 |
| 2010/0238923 A1* | 9/2010 | Cheon et al. | 370/389 |
| 2012/0290703 A1* | 11/2012 | Barabash et al. | 709/223 |
| 2012/0317566 A1* | 12/2012 | Santos et al. | 718/1 |

(Continued)

OTHER PUBLICATIONS

"Virtual Taps," Net Optics: Architecting Visibility Into Your Netowrk, p. 1-5 (accessed Jun. 30, 2016).

(Continued)

*Primary Examiner* — Aftab N. Khan
(74) *Attorney, Agent, or Firm* — Jenkins, Wilson, Taylor & Hunt, P.A.

(57) ABSTRACT

A method for monitoring data associated with a virtual computing environment is provided. The method includes receiving virtually-originated data, wherein the virtually-originated data originated from a virtual server in the virtual computing environment and transmitted in the form of data packets. The method also includes encapsulating the virtually-originated data using a tunneling protocol, forming encapsulated traffic. The method further includes transmitting the encapsulated traffic to a tap device, wherein the tap device decapsulates the encapsulated traffic to recover a version of the virtually-originated data and forwards the version of the virtually-originated data to a monitoring device.

18 Claims, 9 Drawing Sheets

(56) References Cited

U.S. PATENT DOCUMENTS

2014/0269709 A1* 9/2014 Benny .................... H04L 45/64
370/392
2015/0236936 A1* 8/2015 Waldbusser ........ H04L 41/0213
370/252

OTHER PUBLICATIONS

Commonly-assigned, co-pending U.S. Appl. No. 14/960,865, for "Methods, Systems, and Computer Readable Media for Packet Monitoring in a Virtual Environment," (Unpublished, filed Dec. 7, 2015).

"Network function virtualization," https://en.wikipedia.org/wiki/Network_function_ virtualization, pp. 1-7 (Nov. 23, 2015).

"Software-defined networking," https://en.wikipedia.org/wiki/Software-defined_ networking, pp. 1-9 (Nov. 13, 2015).

Commonly-assigned, co-pending U.S. Appl. No. 14/939,674 for "Methods, Systems, and Computer Readable Media for Testing Network Function Virtualization (NFV)," (Unpublished, filed Nov. 12, 2015).

"Ixia Phantom vTap™ with TapFlow™ Filtering," Ixia Data Sheet, Document No. 915-6805-01 Rev. K, pp. 1-4 (Jul. 2015).

* cited by examiner

ARRANGEMENTS FOR MONITORING NETWORK TRAFFIC ON A CLOUD-COMPUTING ENVIRONMENT AND METHODS THEREOF

BACKGROUND OF THE INVENTION

In today's environment, a company has to depend upon its network to be fully functional in order to conduct business. In other words, the network has to be protected from external attacks (such as virus attacks, malware attacks, etc.). To ensure the vitality of the company, network taps and monitoring devices may be employed to monitor the network traffic.

Figure 1:
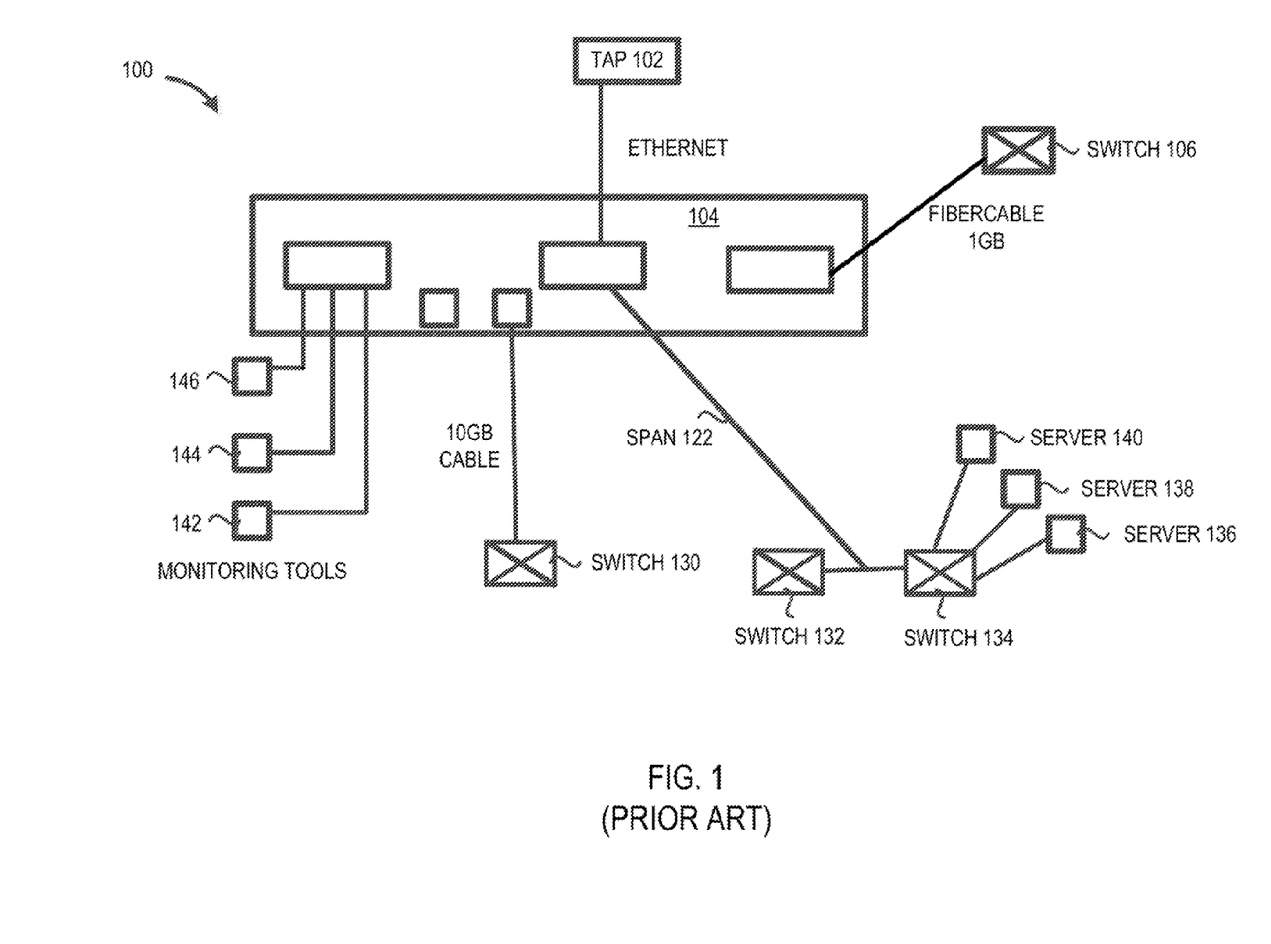
FIG. 1 shows a simple block diagram of a network environment.

To facilitate discussion. FIG. 1 shows a simple block diagram of a network environment. Consider the situation wherein, for example, data traffic is flowing through a network arrangement 100. In a typical network, a plurality of switches (130, 132 134, and 106) may be employed, to route data through the network. For example, network traffic from servers 136, 138 and 140 may be flowing through the network via switch 134.

To monitor the network traffic, network taps may be employed. In an example, a monitoring port, such as span port 122, may be configured to copy network traffic flowing through switch 134. The copied network traffic may then be forwarded to an inline tap device, such as a director device 104, for processing. For network traffic that originates from switches that do not have built-in span function, director device 104 may also include tap module (such as tap 102) that is configured for copying network traffic data for processing. Upon receiving the network traffic, director device 104 may process the data (such as filtering, regenerating, and aggregating) before forwarding the network traffic to one of the monitoring devices (142, 144, and 146).

In a typical network environment, such as the one described above in FIG. 1, the network tap device, such as director device 104, is physically connected (directly or indirectly) to the other devices/machines within the network. For example, director device 104 has a direct physical connection to switch 134. In another example, director device 104 is physically connected to servers 136, 138 and 140 via switch 134. By being physically connected, director device 104 is able to tap into the network and monitor the traffic flow.

As can be appreciated from the foregoing, having the ability to tap into the network enables a company to monitor traffic flowing throughout its network. As a result, the company is able to manage and even prevent potential problems. Unfortunately, not all network traffic can be monitored. The ability to monitor network traffic is usually limited to the physical relationship a network tap device has with the other machines/devices (e.g., computers, servers, switches, etc.) that are physically connected to the network. However with the popularity of the Internet, a new type of network (a virtual network) has emerged that has challenged the capability of the current monitoring tools (e.g., network tap devices, monitoring devices, etc.).

In a virtual network, such as a cloud-computing network, network traffic is flowing through computing resources that may be abstract representations of the actual physical hardware. As discussed herein, cloud-computing network/environment refers to an environment in which computing resources (such as storage and software applications) are shared and accessed via the Internet. Typically, the computing resources are located remotely or on a virtual machine (such as a virtual server). As defined herein, a virtual machine is a software representation of a computing device.

Figure 2A:
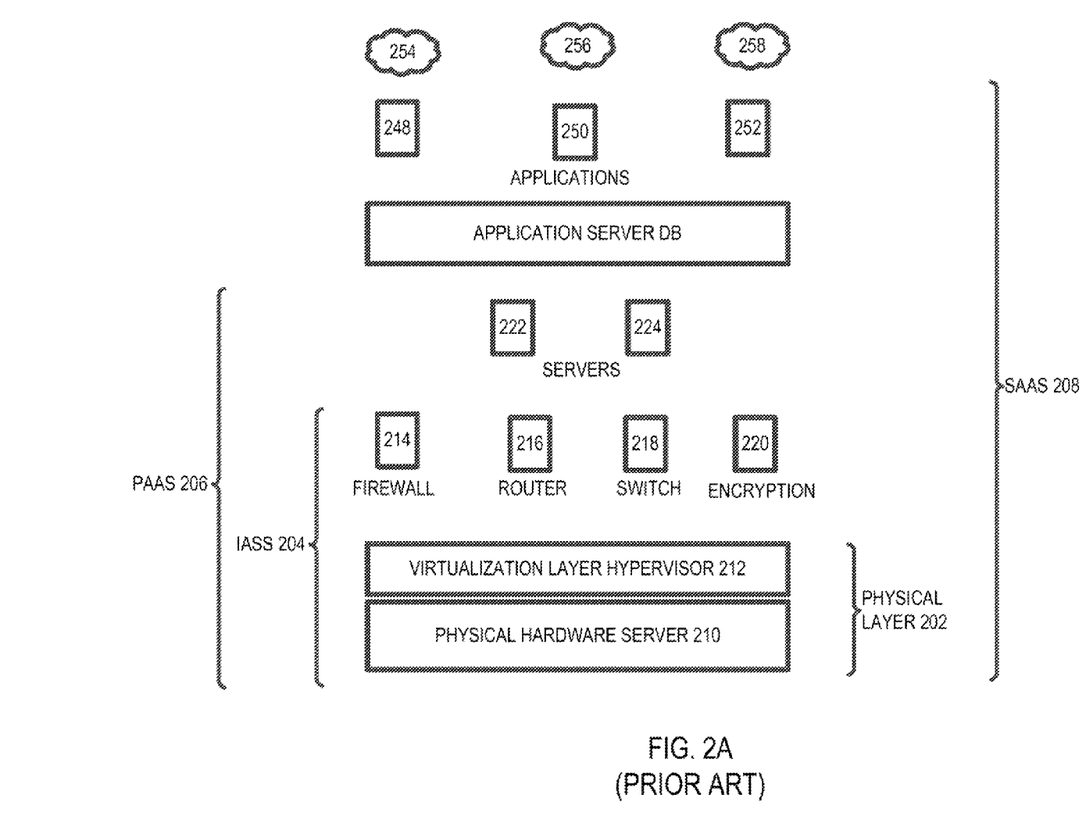
FIG. 2A shows a system infrastructure for implementing a cloud-computing environment.

FIG. 2A shows a system infrastructure for implementing a cloud-computing environment. Cloud-computing environment may be offered as an infrastructure-as-a-service (IAAS 204), platform-as-a-service (PAAS 206), or software-as-a-service (SAAS 208). The most basic infrastructure available, IAAS 204 may include a physical layer 202 that may include as physical hardware server 210. Above this layer is the virtualization layer hypervisor 212, which is a software component that resides on the physical hardware server 210 and provides virtualization capability to the hardware. Above the physical layer are the software applications such as firewall 214, virtual routers 216, virtual switch 218, and encryption service 420, in essence. IAAS 204 provides its members with network and storage capability.

At the next infrastructure. PAAS 206 incorporates the services provided at IAAS 204 in addition to providing access to virtual servers (222 and 224). With PAAS, members may now have access to server capability in addition to the network and storage capability offered at IAAS 204. PAAS 206 usually does not provide software management; therefore, members in this cloud infrastructure are still responsible for managing their own software applications.

As the most comprehensive infrastructure implementation, SAAS 208 provides the services offered by PAAS 206 in addition to access to software applications (248, 250 and 252). Members in this cloud, now have access to a complete solution of an abstraction infrastructure with a virtual networks and virtual servers that offers a range of applications and storage capability. Entities that currently offer this type of cloud infrastructures include Google.com (254), Salesforce.com (256), and MobileMe.com (258).

As can be appreciated from the foregoing, a cloud-computing environment offers different types of cloud infrastructures that may satisfy different individual and/or organization's requirements. In addition, since the cost of computing resources can be distributed across a greater numbers of members, membership into the various different cloud networks have experienced an exponential growth. As a result, the amount of network traffic flowing through a virtual environment has significantly increased.

With cloud computing, network traffic may now be flowing through computing resources (such as storage and software applications) that are not limited by geography or space. Instead, computing resources are now available through a virtual environment. Since the purpose of the virtual computing resources (e.g., virtual servers, virtual switches, virtual storage area, etc.) is to maximize the overall network computing resources, at least portion of the virtual computing resources are configurable. In other words, the system administrator may move a portion of the virtual computing resources among the available physical resources in an attempt to perform load balancing. In addition, the size of the virtual computing resources may be altered depending upon the need and actual usage of the virtual computing resources. Since network traffic is now flowing through a virtual environment that are not geographically bound and that may expand and contract as needed, monitoring of network traffic becomes virtually impossible.

Consider the situation wherein a company's network environment is no longer the traditional hardwired network environment. Instead, the company's network environment includes a hybrid of the physically connected devices and also computing resources available through a cloud-computing environment (FIG. 2B), in this environment, a director device 262 is physically connected to servers 264, 266, and 268 via a switch 270. Thus, director device 262 is able to monitor the network traffic flowing between the servers and the switch.

Figure 2B:
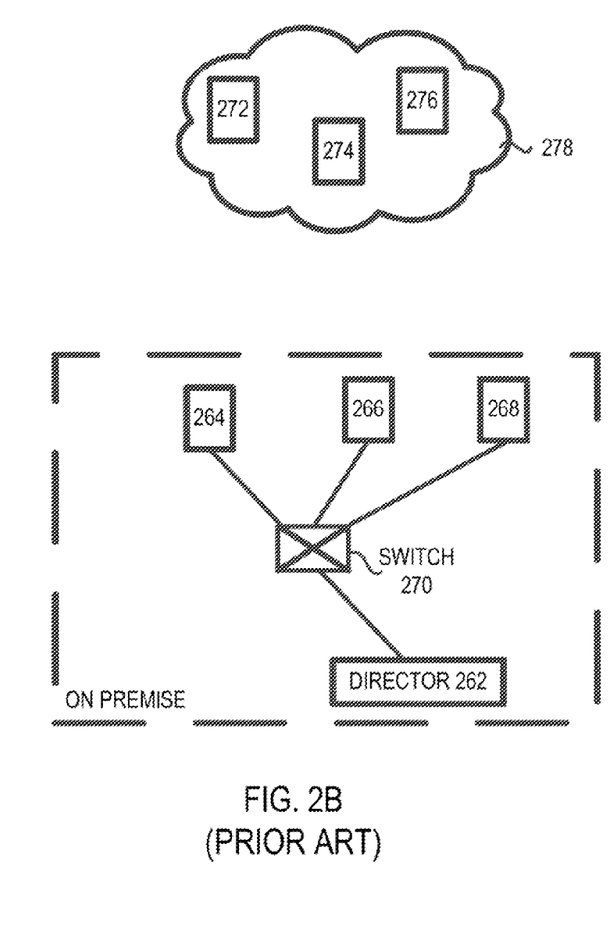
FIG. 2B shows a hybrid network environment.

In order to make certain computing resources available to its members, the company may also establish a private cloud 278 wherein different computing resources (such as access to storage and software applications) may be made available through a plurality of virtual servers 272, 274 and 276. If the virtual servers are located off premise, the ability to monitor the network traffic flowing through private cloud 278 becomes virtually impossible since private cloud 278 is an abstraction and is not physically available. Thus, a physical connection can not be established between the virtual servers on private cloud 278 and director device 262.

Being off premise is not the only reason why a physical connection can not be established between director device 262 and private cloud 278. Another reason for the connectivity issue is that computing, resources on a cloud may not always be associated with the same physical host computing device. Since the virtual computing resource is a software implementation, the virtual computing resource may be moved between physical hosts in response to load balancing.

A physical connection between director device 262 and a cloud-computing environment such as private cloud 278 is further hindered by the elasticity nature of a cloud. Since the cloud is an abstraction infrastructure, the size of the cloud may be expanded or shrunk based on demands and needs. For example, the storage capacity of private cloud 278 may expand if more memory is allotted to virtual server 272.

As can be appreciated from the foregoing, the task of monitoring network traffic to ensure the vitality of a company become a challenge since network taps and other monitoring devices are unable to perform their basic functions given that as physical connection between the network taps and the virtual computing resources can not be established. Thus, in today Internet environment, many of the network traffic may be flowing unmonitored through a cloud-computing network. Given that some of the unmonitored network traffic may be corrupted or may contain malware and can damage the integrity and vitality of a company, the ability to monitor network traffic, regardless of its origin or the type of network it traverses, remains crucial.

Accordingly, arrangements and methods for performing network monitoring on a cloud-computing network environment are desirable.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

The invention is described with reference to specific architectures and protocols. Those skilled in the art will recognize that the description is for illustration and to provide examples of different mode of practicing the invention. The description is not meant to be limiting. For example, reference is made to network traffic and packets, while other forms of data and addresses can be used in the invention. The invention is applicable to both wire and optical technologies. In addition, even though the invention may be described using an inline tap example, the invention is not limited, to an inline device and may include programmable logic, for performing inline and/or span functions.

In today digital age, the Internet has enabled the creation of different types of networks. For example, in a traditional private network, devices within the network may be physically hardwired. As previously mentioned, the task of monitoring network traffic is possible when a network tap device is able to physically tap into other network machines/devices. However, there are also networks in which the network traffic is flowing between physical and/or virtual entities that may not be physically connected. Network traffic that are flowing between physical/virtual entities that are remotely located are more difficult to monitor. More specifically, the current art does not provide for monitoring of network traffic flowing to and from a virtual environment (such as a cloud-computing environment) since the computing resources within a virtual environment may be elastic and may not be geographically bound.

In one aspect of the invention, the inventors herein realized that network traffic can be directly sent to a network tap for monitoring. In other words, since the port address of the network tap is a given factor, arrangements or methods can be established in the virtual environment to enable special channels to be created enabling network traffic to be tunneled directly to the network tap for monitoring.

In accordance with embodiments of the present invention, arrangements and methods are provided for monitoring network traffic flowing within a virtual environment (such as within a cloud-computing environment). Embodiments of the invention include implementing tunnel components within the virtual environment and within a network tap device, wherein the tunnel components create an interface that enables the network traffic to be packaged and sent to the network tap device for monitoring.

In an embodiment of the invention, a policy engine with predefined criteria may be employed to analyze the network traffic flowing through the virtual environment. As is known to those skilled in the an, a policy engine represents the entity that analyzes network traffic and applies predefined treatment to the analyzed traffic. The policy engine is configurable and may be changed as needed. In an embodiment, the policy engine analyzes the data before the data is forwarded onward to its destination.

In an embodiment of the invention, a tunnel creation module may be employed to package the network traffic that passes the criteria defined by the policy engine. The modified network traffic, after being packaged, may be encapsulated with a special packet header. In addition, a special channel (tunnel) is created to send the modified network traffic to the network tap device through the network interface card that is associated with the physical host.

Upon receiving the modified network traffic, in an embodiment, a tunnel termination module may be employed to analyze the incoming network traffic. If the network traffic is identified as an encapsulated network traffic that has been modified, the tunnel termination module may unbundle the package and remove the encapsulation and the special packet header, thereby reverting the modified network traffic back to its original state. In addition, the tunnel termination module may terminate the opened tunnel between the virtual environment and the network tap device. The network traffic is then forwarded to the network tap device for processing. Processing may involve, for example, performing one or more of network analyzing, malware detection, malware prevention, intrusion detection, intrusion prevention, remote monitoring, probing using facilities (either hardware or software) provided with the tap or by forwarding the de-tunneled network traffic to an appropriate device/devices that performs one or more of said network analyzing, intrusion detection, intrusion prevention, remote monitoring, and probing. The result of the monitoring may be employed to decide whether to permit the traffic to be further transmitted onward to the destination device or to warn the operator or to trigger action that protects the network components.

In one or more embodiments, if the tunneling mechanism fails (either at the client or at the tap device), a hardware or software switch is tripped and the network traffic from the virtual environment is allowed to be transmitted to the destination device specified by the header of the virtual network traffic (as is expected in the typical case without monitoring). For example, software or hardware failure detection may be employed to determine whether the tunneling mechanism works properly and to trip the switch if a failure is detected. With this implementation, a failure in the tunneling mechanism does not cause an interruption in the virtual network traffic (i.e., the virtually-originated traffic is still allowed to reach its destination even if the tunneling mechanism fails). In other words, the virtual monitoring by the tunneling approach is essentially transparent and does not impede virtual network traffic even if a tunneling failure is experienced. On the other hand, when the tunneling mechanism described, and implemented as described herein is functional, monitoring of virtual network traffic becomes feasible.

In an alternate embodiment, the virtually-originated traffic or traffic destined for the virtual environment may be transmitted to its destination independently in parallel with the tunnel-implemented monitoring. In this case, monitoring is performed in a snooping and surreptitious manner, with no impact on the virtual traffic.

Figure 3:
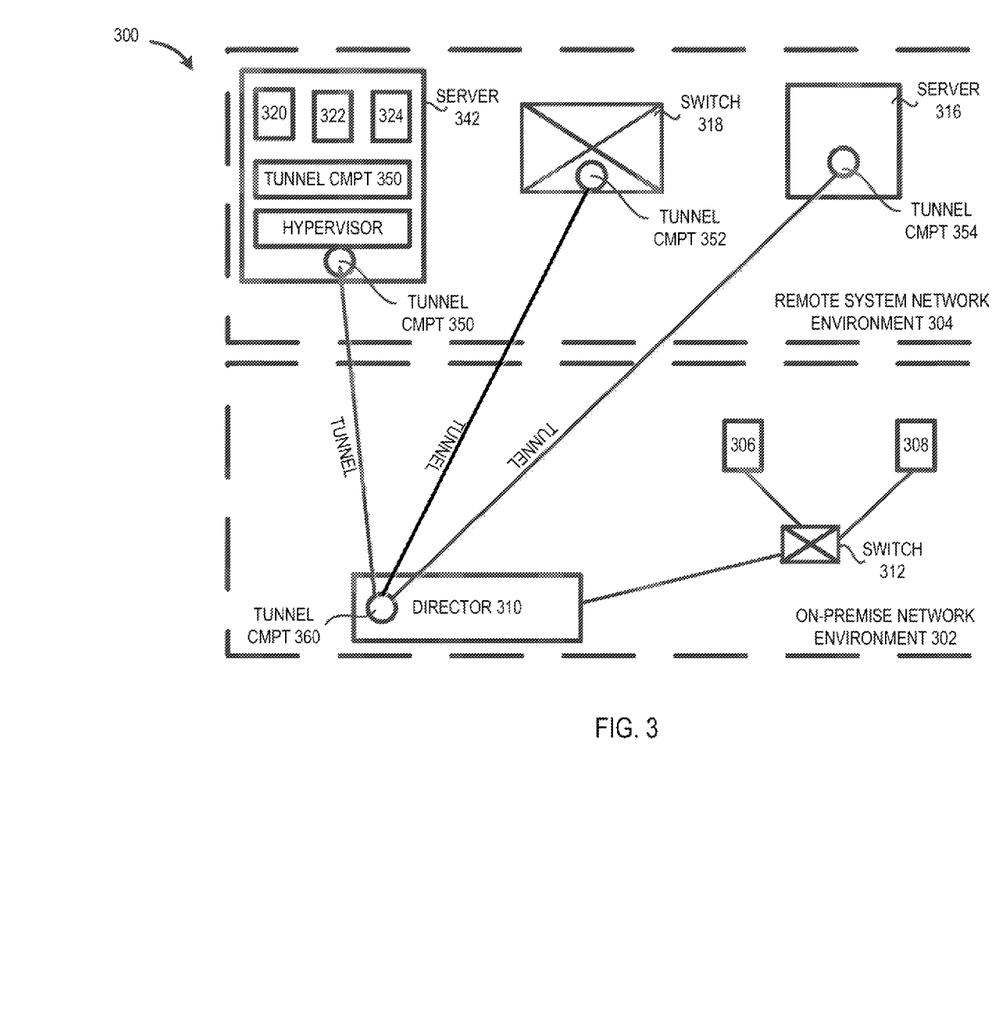
FIG. 3 shows, in an embodiment of the invention, a cloud-computing network environment with monitoring capability.

The features and advantages of the present invention may be better understood with reference to the figures and discussions that follow, FIG. 3 shows, in an embodiment of the invention, a cloud-computing network environment with monitoring capability. Consider the situation wherein, for example, a company may have a network 300 with an on-premise network environment 302 and a remote system network environment 304. The on-premise network environment 302 may include a plurality of servers (306 and 308) physically connected to a network tap device (such as director device 310) via a switch 312. Since director device 310 is physically hardwired to the servers via switch 312, director device 310 is able to monitor the network traffic flowing between the servers.

In addition to the local servers, the company may also have a remote system network environment that offers computing resources to its members through a virtual environment. As a result, network traffic may be coming remotely from geographically dispersed machines. For example, network traffic may be flowing from remotely located physical machines such as physical servers (e.g., server 316) and remotely located physical switches (e.g., switch 318). Alternatively or additionally, network traffic may also be flowing from a virtual environment such as from virtual servers 320, 322, and 324. Alternatively or additionally, network traffic may also be flowing from virtual or physical servers that may be disposed locally or remotely or a combination thereof.

In the prior art, the network traffic flowing from remote system network environment 304 may be unmonitored since director device 310 is unable to tap into the network how given that director device 310 is unable to communicate with the remotely located machines. This limitation is further complicated by the existence of virtual servers (320, 322, and 324) that may be indefinite in term of location (e.g., remote versus local server) and size.

In one aspect of the invention, the inventors herein realized that if an interface can be established between a network tap device and a remotely located machine, a logic arrangement may be provided to enable the two devices to communicate and thus enable the network tap device to remotely monitor the network traffic flowing through the remotely located machines.

Figure 4:
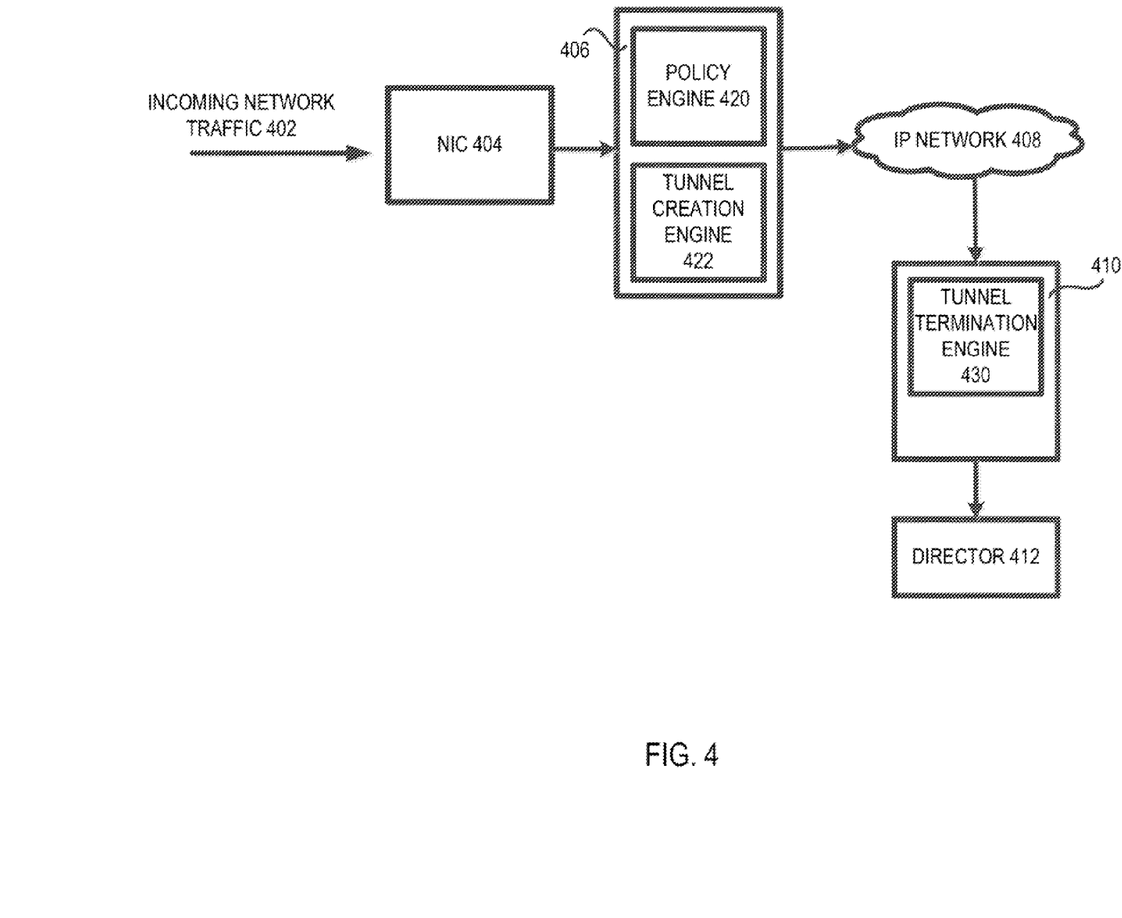
FIG. 4 shows, in an embodiment of the invention, a simple logic block diagram of the creation and termination of a tunnel.

In an embodiment of the invention, a client-side tunnel component (350, 352, and 354) creates a tunnel for communicating with a tap-side tunnel component (360) in order to perform network traffic management across a cloud-computing environment (i.e., a virtual environment). To illustrate, FIG. 4 shows, in an embodiment of the invention, a simple logic block diagram of the creation and termination of a tunnel. FIG. 4 will be discussed in relation to the method steps described in FIG. 5 and FIG. 6.

Figure 5:
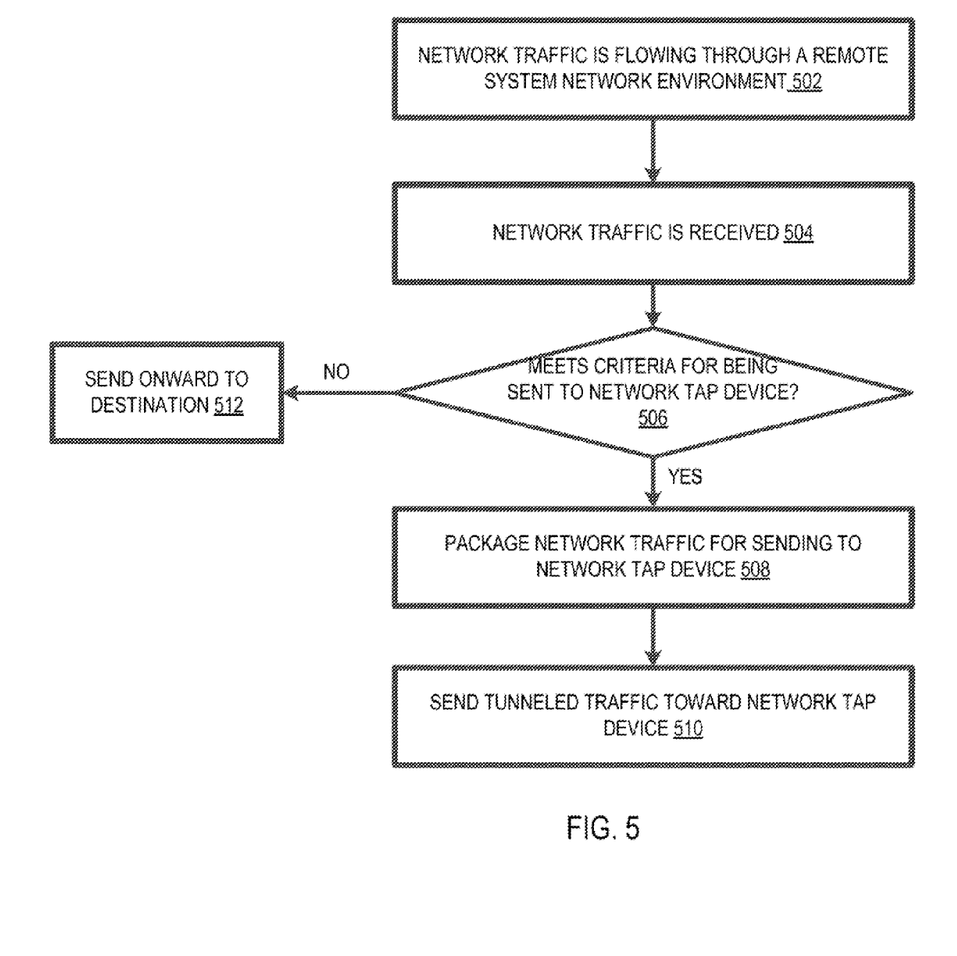
FIG. 5 and FIG. 6 show, in embodiments of the invention, methods for implementing creation and termination of tunnels.

At point 402, network traffic is flowing through a cloud-computing environment, such as virtual server 324 (step 502). The network traffic then flows through hypervisor layer 350 (see FIG. 3) and reaches a network interface card 404, which provide an interface between remote server 342 (which may be a single server or a collection of servers) of FIG. 3 and the Internet (step 504). In an embodiment, a client-side tunnel component 406 is provided at network interface card 404 to provide network traffic management. By way of example, such client-side tunnel component may be installed via a web-interface. Client-side tunnel component 306 may include a policy engine 420 that is configured to determine if the network traffic meets a predefined set of criteria (step 506). If the criteria are not met, the network traffic is forwarded onward to its destination (step 512) without tunneling encapsulation. However, if the criteria are met, tunnel creation engine 422 of client-side tunnel component 406 performs tunnel creation (step 508). In tunnel creation, tunnel creation engine 422 packages the network traffic by adding a packet header to the originating network traffic, encapsulating, the packet and sending the modified network traffic through an IP network 408 via a tunnel protocol (such as Generic Routing Encapsulation "GRE" or IPSEC or the like) to its destination via the network interface card (step 510). An alternate embodiment would be to implement the tunnel creation component, including the tunnel creation engine, on a server external of and downstream of remote server 342.

Figure 6:
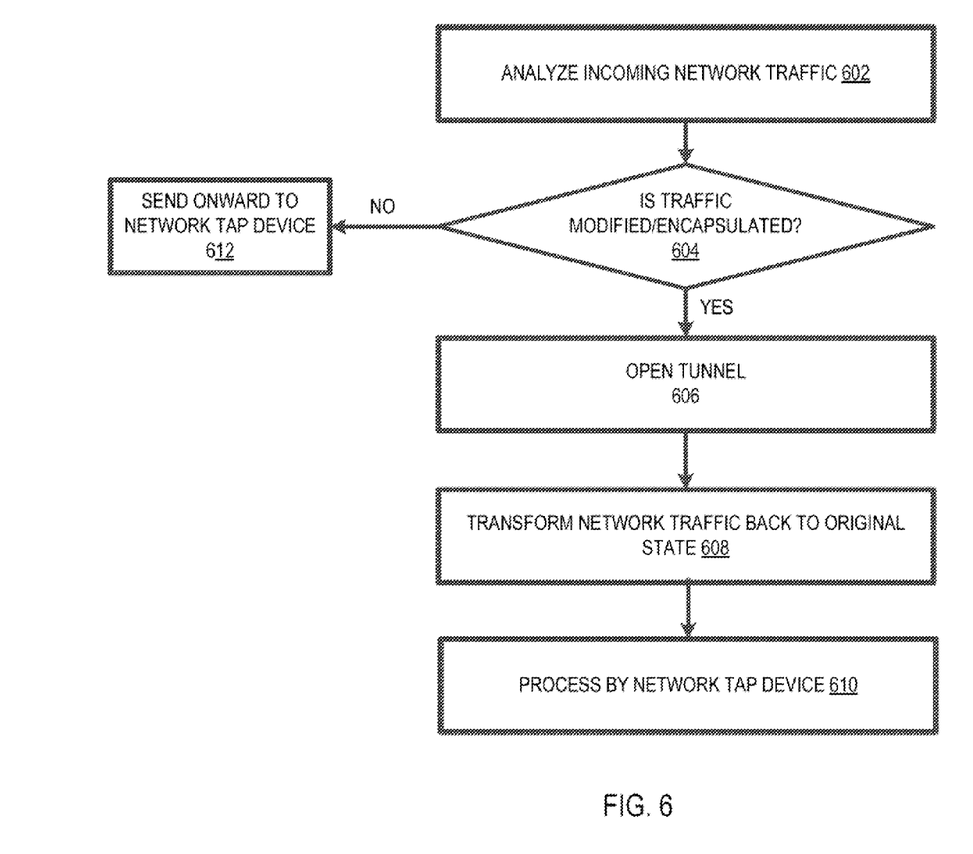

In an embodiment, a network tap device, such as a director device, may be configured to include a tap-side tunnel component 410, which is configured to interface with client-side tunnel component 406 through the IP network. Tap-side tunnel component 410 may include a tunnel termination engine 430, which may be configured to analyze the incoming network traffic (step 602). A determination is made by termination engine 430 on whether or not the incoming network traffic has been modified and/or encapsulated (step 604). If the incoming network traffic has been modified, a tunnel is opened (step 606) and the modified network traffic is unpackaged to transform the modified network traffic back to a version of the original network traffic—step 608—which may be the original network traffic itself in one embodiment. The original network traffic is then copied and process by a director device 412 (step 610). Director 412 may then forward the original network traffic to an appropriate monitor device(s), which may represent(s), for example, one or more of network analyzers, intrusion detection systems, intrusion, prevention systems, remote monitors, and probes.

Note that if a determination is made that the incoming network traffic has not been modified or encapsulated, the network traffic is forwarded without decapsulation and/or without de-tunneling directly to director device 412 for processing (step 612) and/or to the destination device.

As can be appreciated from FIGS. 4-6, by adding tunneling capability to the existing infrastructure, network traffic that originated from remote locations may now be monitored similarly to network traffic that are connected physically to a network tap device. Thus, by using tunneling capability, a company can be assured of continual data surveillance without incurring additional hardware expenses.

Figure 7:
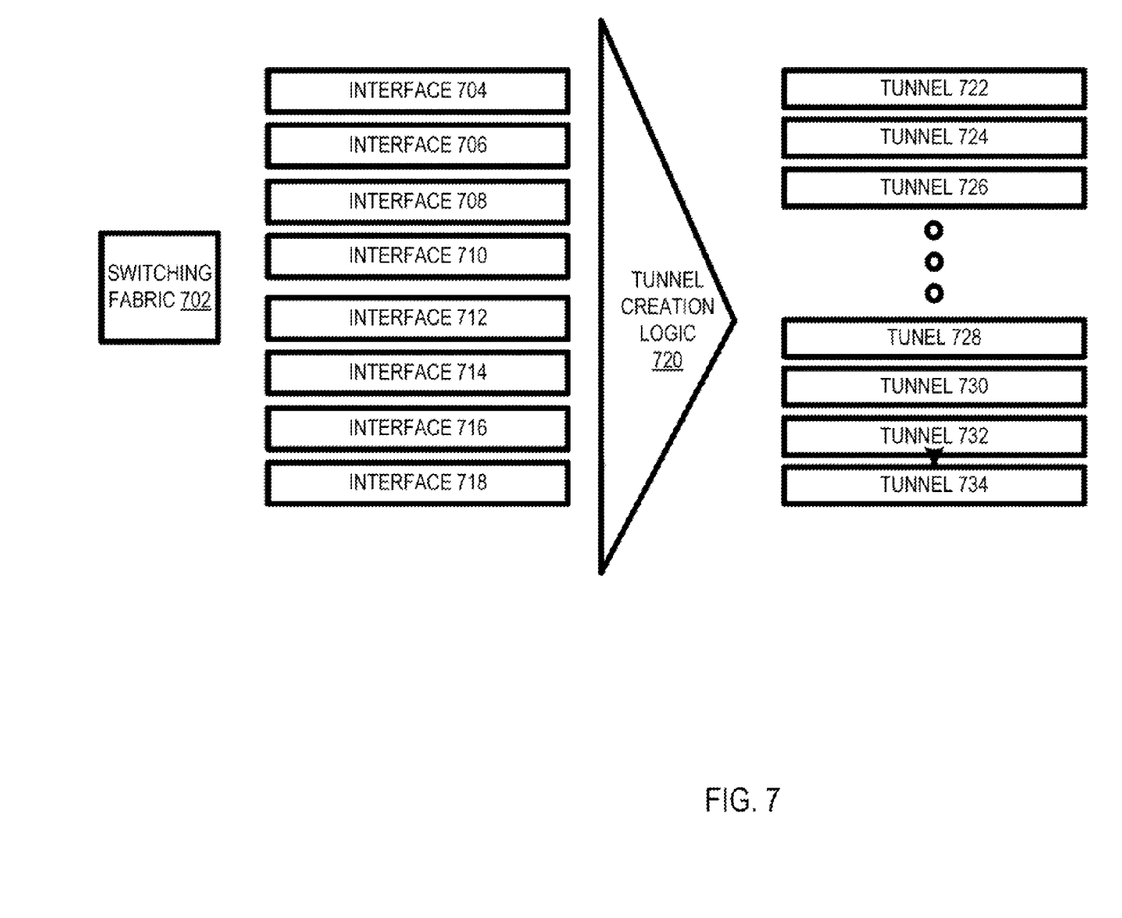
FIG. 7 shows, in an embodiment of the invention, a high density network tap device, such as a director device, may also be configured with tunnel creation logic.

In an embodiment, a high density network tap device, such as a director device, may also be configured with tunnel creation logic (FIG. 7). Consider the situation wherein a high density network tap device, such as a director device, is configured to receive traffic from different Ethernet modes (e.g., 1 gigabytes cable, 10 gigabytes cable, etc.). The incoming network traffic is handled by a switching fabric 702. Depending upon the types of network traffic, switching fabric 702 may forward the network traffic onward to different network interfaces (as shown by network interfaces 704-718). Before forwarding the traffic onward, a tunnel creation logic 720 may be employed for analyzing the network traffic (according to predefined policy criteria) and packaging the network traffic, as needed, before sending the modified network traffic onward to remotely located servers through one of tunnels 722-734.

In an embodiment, the tunnel creation logic 720 may be integrated into the tap-side tunnel component, which supports the tunnel termination logic. In yet another embodiment, the tunnel creation logic 720 may include a policy engine and a tunnel creation engine, similarly to the one in the client-side tunnel component. As can be appreciated from the foregoing, by providing for both a tunnel creation engine and a tunnel termination engine, traffic flowing to and front remote server may be consistently monitored by a network tap device.

Figure 8A:
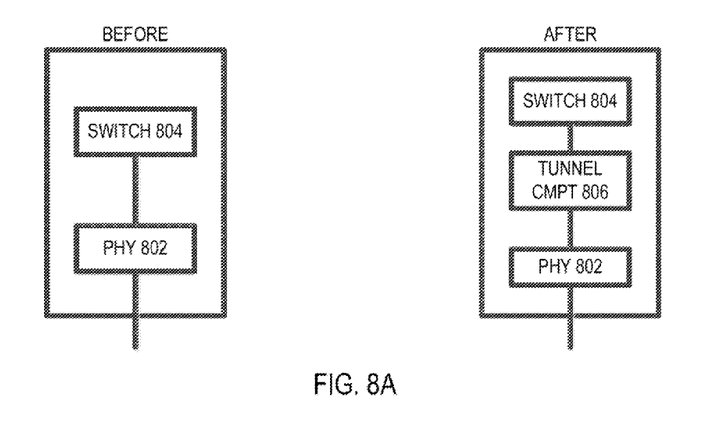
FIG. 8A and FIG. 8B show, in embodiments of the invention, two alternatives for implementing a tunnel component.
Figure 8B:
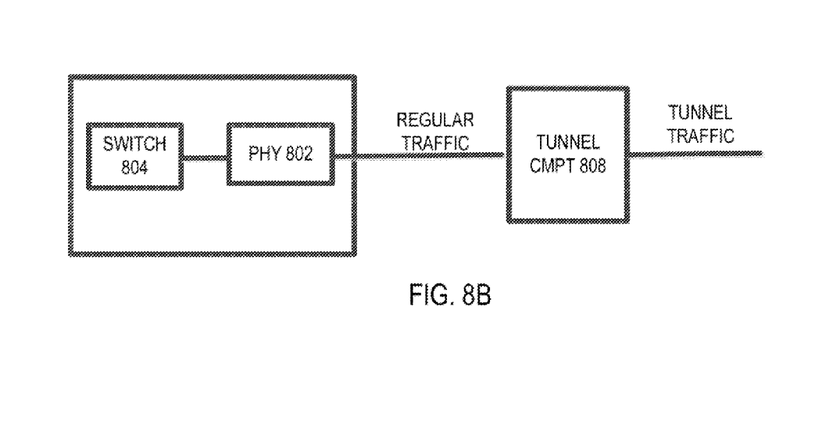

FIGS. 8A and 8B show, in embodiments of the invention, two alternatives for implementing a tunnel component. The implementation is shown as applied to a network tap device; however, a similar configuration can be utilized on client devices. Traditionally, network traffic flows into the network device via a PRY (physical layer device) 802 before flowing through a switch 804 and onward to its destination. In an embodiment, a tunnel component 806 may be implemented directly into the network device between PRY 802 and switch 804. In another embodiment, a tunnel component 808 may be implemented as a separate component external to the network device.

In an embodiment, the tunnel component may be implemented as a hardware component. In an example, an additional hardware component may be added to the existing network device. In another example, current electronic components of the network device may be enhanced to include the tunneling capability. For example, an existing chip may be enhanced to include tunnel creation and/or termination capability.

In another embodiment, the tunnel component may be implemented as a software component. As a software component, the tunnel capability may be added to the network device through a software application. Advantageously, the enhancement may be done remotely. By using software enhancement, a company can take advantage of the new enhancement without being required to undergo expensive modification of existing hardware or the purchase of new hardware.

As can be appreciated from the foregoing, one or more embodiments of the present invention provides for arrangements and methods for extending monitoring capability across a virtual network. By integrating tunnel capability into existing hardware, visibility into virtual network is provided. Further, since the existing hardware does not require expensive overhaul, a company may leverage the cost of its current network monitoring system across as broader network environment.

In this document, examples may be provided in which a half-duplex network run be employed to illustrate embodiments of the invention. This invention, however, is not limited, to a half-duplex network and may also be implemented in a full-duplex network. Additionally or alternatively, the invention is not limited to any particular speed and may be implemented for any suitable speed or combination of speeds (e.g., 1 Gigabits/sec, 10 Gigabits/sec, 100 Gigabits/sec, etc.). Alternatively or additionally, the invention is not limited to any particular transport media or channels. Also, in this document, examples may be provided using a director device to illustrate embodiments of the invention. However, this invention is not limited to a director device and may also be implemented in any network tap device. Instead, the discussions are meant as examples and the invention is not limited by the examples presented.

While this invention has been described in terms of several preferred embodiments, there are alterations, permutations, and equivalents, which fall within the scope of this invention. Although various examples are provided herein, it is intended that these examples be illustrative and not limiting with respect to the invention.

Also, the title and summary are provided herein for convenience and should not be used to construe the scope of the claims herein. Further, the abstract is written in a highly abbreviated form and is provided herein for convenience and thus should not be employed to construe or limit the overall invention, which is expressed in the claims. IF the term "set" is employed herein, such term is intended to have its commonly understood mathematical meaning to cover zero, one, or more than one member. It should also be noted that there are many alternative was of implementing the methods and apparatuses of the present invention. It is therefore intended that the following appended claims be interpreted as including all such alterations, permutations, and equivalents as fall within the true spirit and scope of the present invention.

What is claimed is:

1. A method for monitoring data associated with a virtual computing environment, comprising:
    receiving, at a client-side tunnel component in a server device executing a virtual computing environment, virtually-originated data intended for a first destination, the virtually-originated data originating from at least one virtual server executing in the virtual computing environment on the server device, wherein the first destination is different from a tap device, said virtually-originated data originated from a virtual server in said virtual computing environment and transmitted in the form of data packets;
    encapsulating, at the client-side tunnel component, said virtually-originated data using a tunneling protocol, forming encapsulated traffic;
    transmitting, at the client-side tunnel component, said encapsulated traffic to the tap device, wherein said tap device decapsulates said encapsulated traffic to recover a version of said virtually-originated data and forwards said version of said virtually-originated data to a monitoring device, wherein said tap device forwards at least some of said virtually-originated data to the first destination in response to a monitoring determination;
    using a policy engine to analyze said virtually-originated data, said virtually-originated data is encapsulated only when said virtually-originated data fits criteria to be forwarded to one of said tap device and said monitoring device; receiving other data;
    determining, using said policy engine, whether said other data fits said criteria to be forwarded to said one of said tap device and said monitoring device; and
    transmitting said other data onward without encapsulating said other data using said tunneling protocol when said other data does not fit said criteria to be forwarded to said one of said tap device and said monitoring device.

2. The method of claim 1 wherein said monitoring device represents a network analyzer.

3. The method of claim 1 wherein said monitoring device represents an intrusion detection system.

4. The method of claim 1 wherein said monitoring device represents an intrusion prevention system.

5. The method of claim 1 wherein said monitoring device represents a remote monitor.

6. The method of claim 1 wherein said monitoring device represents a network probe.

7. The method of claim 1 wherein said tap device decapsulates said encapsulated traffic using a tunnel component implemented on a NIC (network interlace card).

8. The method of claim 1 wherein said tap device decapsulates said encapsulated traffic using a tunnel component implemented external of said tap device.

9. A method for monitoring data originating from a virtual computing environment, comprising;
    receiving, at a client-side tunnel component in a server device executing a virtual computing environment, virtually-originated data intended for a first destination, the virtually originated data originating from at least one virtual server executing in the virtual computing environment on the server device, wherein the first destination is different from a tap device, said virtually-originated data originated from is virtual server in said virtual computing environment;
    forming, at the client-side tunnel component, tunneled traffic from said virtually-originated data using a tunneling protocol;
    transmitting, at the client-side tunnel component, said tunneled traffic through an IP network to a tap device, wherein said tap device de-tunnels said tunneled traffic to recover a version of said virtually-originated data;
    routing said version of said virtually-originated data to a monitoring device, said monitoring device represents one of a network analyzer, an intrusion detection system, an intrusion prevention system, a remote monitor, and a network probe, wherein said tap device forwards at least some of said virtually-originated data to the first destination in response to a monitoring determination;
    using a policy engine to analyze said virtually-originated data, said virtually-originated data is formed into said tunneled traffic only when said virtually-originated data fits predetermined criteria; receiving other data;
    determining, using said policy engine, whether said other data fits said predefined criteria; and
    transmitting said other data onward without processing said other data for tunneling using said tunneling protocol when said other data does not fit said predefined criteria.

10. The method of claim 9 wherein said monitoring device represents said network analyzer.

11. The method of claim 9 wherein said monitoring device represents said intrusion detection system.

12. The method of claim 9 wherein said monitoring device represents said intrusion prevention system.

13. The method of claim 9 wherein said monitoring device represents said remote monitor.

14. The method of claim 9 wherein said monitoring device represents said network probe.

15. The method of claim 9 wherein said virtually-originated data is also independently transmitted to a destination device specified by a header of said virtually-originated data independent of said transmitting to said tap device.

16. The method of claim 9 wherein said tap device de-tunnels said tunneled traffic using a tunnel component implemented on a NIC (network interface card).

17. The method of claim 9 wherein said tap device de-tunnels said tunneled traffic using a tunnel component implemented external of said tap device.

18. A system for monitoring data associated with a virtual computing environment, comprising:
- a client side tunnel component executing in a virtual computing environment on a server device;
- a tap device;
- the client-side tunnel component for receiving virtually-originated data intended for a first destination, the virtually-originated data originating from at least one virtual server executing in the virtual computing environment on the server device, wherein the first destination is different from the tap device, said virtually-originated data originated from a virtual server in said virtual computing environment and transmitted in the form of data packets;
- the client side tunnel component encapsulating said virtually-originated data using a tunneling protocol, forming encapsulated traffic;
- the client-side tunnel component transmitting, at the client-side tunnel component, said encapsulated traffic to the tap device, wherein said tap device decapsulates said encapsulated traffic to recover a version of said virtually-originated data and forwards said version of said virtually-originated data to a monitoring device, wherein said tap device forwards at least some of said virtually-originated data to the first destination in response to a monitoring determination;
- a policy engine configured to analyze said virtually-originated data, said virtually-originated data is encapsulated only when said virtually-originated data fits criteria to be forwarded to one of said tap device and said monitoring device; and
- the client side tunnel component receiving other data, determining, using said policy engine, whether said other data fits said criteria to be forwarded to said one of said tap device and said monitoring device, and transmitting said other data onward without encapsulating said other data using said tunneling protocol when said other data does not fit said criteria to be forwarded to said one of said tap device and said monitoring device.

* * * * *